Dec. 20, 1966  H. G. FISCHER  3,292,888
I-BEAM CLAMP FOR SUPPORTING AN ELECTRICAL OUTLET
BOX, MULTIPLE CONDUITS AND/OR PIPES
Filed Sept. 21, 1965
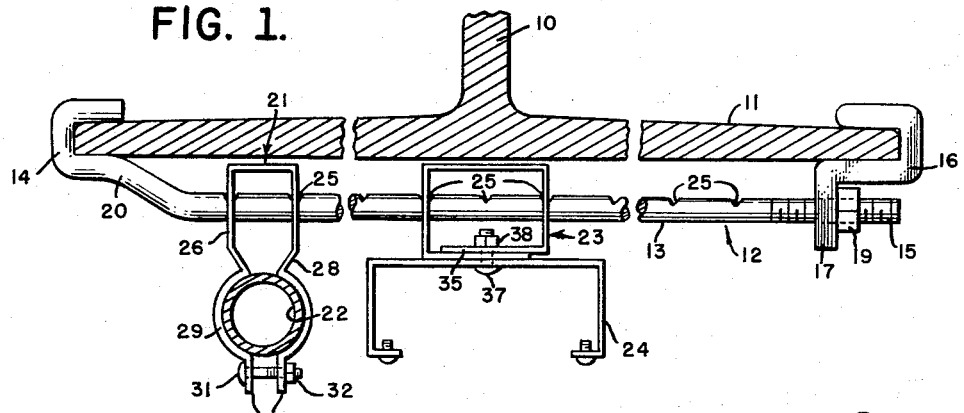
FIG. 1.
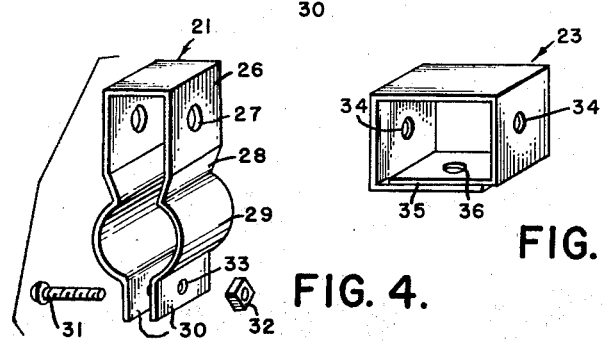
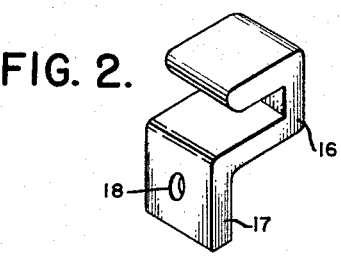
FIG. 2.
FIG. 4.   FIG. 5.
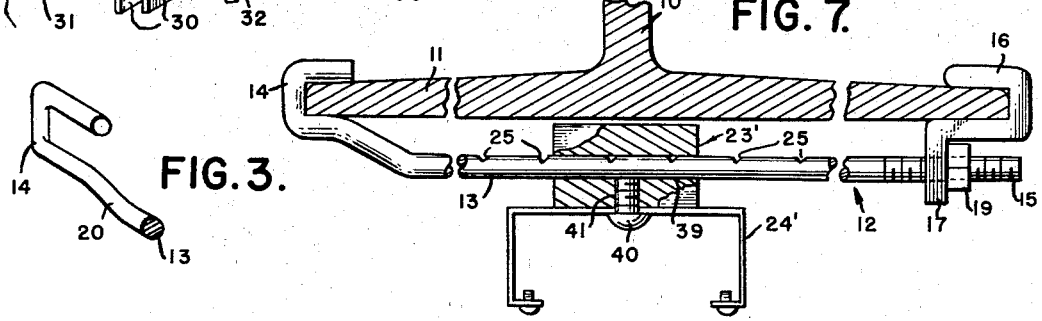
FIG. 3.   FIG. 7.
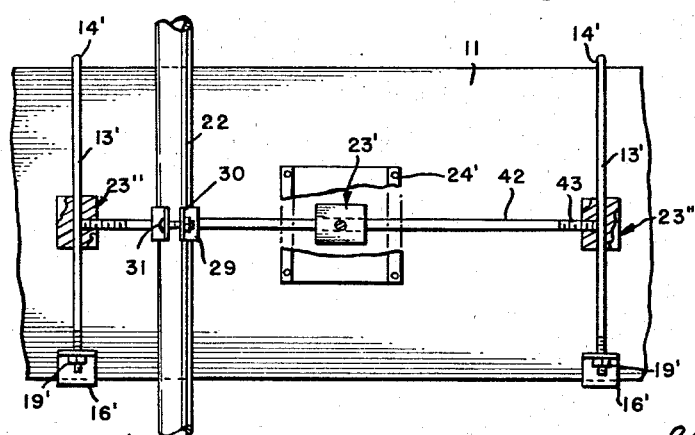
FIG. 6.
FIG. 8.
INVENTOR
HARRY G. FISCHER
BY *Garvey & Garvey*
ATTORNEYS

United States Patent Office 3,292,888
Patented Dec. 20, 1966

3,292,888
I-BEAM CLAMP FOR SUPPORTING AN ELECTRICAL OUTLET BOX, MULTIPLE CONDUITS AND/OR PIPES
Harry G. Fischer, 1636 Park Road,
Covington, Ky. 41011
Filed Sept. 21, 1965, Ser. No. 488,930
9 Claims. (Cl. 248—72)

This invention is an I-beam clamp for supporting an electrical outlet box, multiple conduits and/or pipes, which permits centering of an outlet box beneath an I-beam on either or both sides of which conduits or pipes may be mounted.

Objects of this invention are to provide an assembly which includes a rod, one end of which is bent to conform to the shape of an edge of an I-beam base, at one side, for slidable engagement over said base edge, the rod extending transversely across the beam in spaced relation to its base, and equipped with a bracket detachably mounted on the free end of the rod and shaped to complement the opposite edge of the base flange with which it is slidably engaged; to provide a rod spaced sufficiently from the beam, to accommodate an electrical outlet box at a selected point, on either or both sides of which, hangers for conduits and/or pipes are mounted; and to provide threaded means on the free end of the rod for securing said bracket from displacement on the rod.

This invention further contemplates the use of a supporting assembly, detachably engaged to and pending from the base of a single beam, adapted to support a lighting fixture, conduits and the like which run parallel to the long axis of the beam or at right angles thereto, the assembly including a rod or rods detachably engaged to opposite sides of the beam base, a connector extending along the longitudinal axis of the beam, and fastened to the rods where the objects supported run at right angles to the beam and extend beyond the sides of the latter.

Other objects of the invention will be manifest from the following description of the present preferred forms of the invention, taken in connection with the accompanying drawings, wherein:

FIG. 1 is a fragmentary vertical sectional view of a conventional steel-supporting beam illustrating the application of one form of beam clamp assembly of the present invention;

FIG. 2 is a perspective view of a beam flange bracket of the present invention;

FIG. 3 is a fragmentary perspective view of the hook end of the supporting rod of the clamp assembly;

FIG. 4 is a perspective view of one of the supports of the present assembly;

FIG. 5 is a similar view of another form of support of the assembly;

FIG. 6 is a perspective view of a modified form of support for the outlet box;

FIG. 7 is a similar view to FIG. 1, but showing a modified form of support which is illustrated in FIG. 6; and FIG. 8 is a fragmentary bottom plan view of the supporting beam illustrating the application of another form of assembly used when the objects supported run at right angles to the beam.

In a preferred embodiment of this invention, an I-beam 10 is shown, which is provided with a base flange 11.

A clamping assembly, generally designated 12, is engageable with the flange 11, and in the form of invention shown in FIGS. 1 through 4, comprises a supporting rod 13, one end 14 of which is formed to provide a hook slidable over the edge of one side of the flange 11. The opposite end of the rod is threaded at 15. A clamp bracket 16 is slidable over the free end of rod 13 and complements the flange 11 over which it is slidably engaged, at a point directly opposite to the hook 14. Bracket 16 includes a depending flange 17 having a central aperture 18 adapted to receive the threaded terminal of rod 13. A nut 19 is threaded on the free end of rod 13 to abut the part of bracket 16 which slides on rod 13, to prevent casual displacement of clamp bracket 16. It is to be observed, that the basic assembly 12 remains the same in all forms of the invention, as shown in FIGS. 1, 7 and 8. In each of these forms, the rod 13 is offset downwardly, as indicated at 20, from a point adjacent the hook 14, to retain the rod spaced from the bottom of beam 10, as shown advantageously in FIGS. 1 and 7. By this arrangement, supports of various miscellany may be slidably mounted on the rod 13.

By way of illustration, there is shown in FIG. 1, a support 21 for a conduit or pipe 22 and a support 23 for an outlet box 24 of a lighting fixture. The supports 21 and 23, as here shown, have been found satisfactory for their intended use. They are of lightweight, strap metal construction, and may be moved on the rod with facility to support their loads at the locations selected by the user. Rod 13 is further provided with notches 25 on the upper periphery thereof, at predetermined intervals, for retaining members 21 and 23 at desired locations along the rod.

In use, the metal strap supports 21 and 23 may be secured to the objects supported, after the fashion shown in FIG. 1. The support 21 is here formed of a single strap, the free ends of which are bent into parallel relation to provide an open oblong upper terminal 26, the sides of which are provided with openings 27 through which the rod 13 passes. The lower ends of the oblong sides are pinched, as shown at 28, to provide converging intermediate portions which first issue into arcs 29 and then terminate in parallel securing lips 30. The support 21 is adapted to support objects, circular in cross section, such as a conduit or pipe 22. The oblong upper terminal 26 provides spaced supsension legs. The pinched parts slide over portions of the top of the conduit while the arcs 29 snugly embrace the sides of the latter and lips 30 are secured below the conduit by a bolt 31 and a nut 32, the bolt passing through openings 33 in lips 30. This provides a simple inexpensive support for facile engagement with conduits and like objects.

The support 23 is likewise formed from a single metal strap, folded into a square with openings 34 formed in two opposite sides, for reception of rod 13. The free ends of the strap are overlapped at 35 and provided with aligned openings 36. The openings 36 are adapted to receive therethrough, the shank of a bolt 37 which extends through the top of an electrical outlet box 24, the bolt being secured within the support by a nut 38, which latter additionally serves the function of securing the overlapped ends 35 together. Here again, a simple inexpensive support is provided especially adapted for hanging lighting fixture outlet boxes.

A plurality of supports 21 and 23 may be positioned along rod 13 and are prevented from accidental longitudinal displacement by seating of portions of the members adjacent openings 31 and 37 in notches 25.

Where heavier loads are to be supported, a stronger means may be employed such as a solid block 23′ of steel or other suitable material, illustrated in the form of invention shown in FIGS. 6 and 7.

Block 23′ is provided with a bore 39 extending through the block from end to end. The rod 13 passes through the bore 39, thereby effecting surface contact with the rod completely through the block. In this form of the invention, outlet box 24′ is secured to the block 23′ and rod 13 by a screw 40 which extends through a complemental threaded opening 41 which communicates with bore 22 to effect engagement of the screw with rod 13, as shown in FIG. 7.

In supporting loads which extend at right angles beyond the beam flanges 11 on opposite sides of the beam, a modified form of assembly is preferred. In this form, shown in FIG. 8, multiple rods 13' are used at intervals across the beam base. Each of the rods 13' are identical with rod 13 and like parts are identified by like, primed numbers. Rods 13' are slid through steel blocks 23" to the approximate positions shown in FIG. 8. A connector 42 for the rods 13' is employed in the assembly. The connector as shown in the drawing, is provided at both ends with threaded portions 43. Threaded portions 43 are adapted to be screwed into the threaded openings of blocks 23", the blocks being positioned with the openings in opposed relationship. Block 23' is mounted on connector 42 in the same manner as on rod 13 (see FIG. 7).

Although preferred embodiments of the present invention have been shown and described, it is nevertheless to be understood that various changes may be made therein, without departing from the spirit and scope of the claims hereto appended.

I claim:

1. A clamping assembly for a single beam to support objects running at right angles to the beam, including rods subjacent the base of the beam and detachably engaged with the base of the latter, the assembly also including a connector for the rods which is positioned longitudinally of the beam, means for engaging the ends of the connector with intermediate portions of the rods, and means adjustably mounted on the connector for supporting objects running at right angles to the beam.

2. The clamp assembly of claim 1 in which one of the objects supported by the connector is a retaining member slidably mounted on the connector, the retaining member embodying a clamp portion extending at a right angle to the longitudinal axis of the beam.

3. The clamp assembly of claim 2 in which the assembly also includes an electrical outlet box support slidably mounted on said connector.

4. A clamp assembly for attachment to the base flange of a steel beam including a rod extending across the beam adjacent the base flange, the assembly comprising means carried by the ends of the rod and slidable over opposite edges of the flange, for pendently supporting objects engaged with the rod at various points therealong, a support on the rod for a lighting fixture, comprising a metal strap folded into a square with openings in its opposite sides through which the rod passes, the ends of the strap being overlapped and provided with aligned openings, and securing means for the lighting fixture, the means extending from the fixture through the openings in the overlapped ends of the strap, for holding the fixture and strap ends together.

5. A clamp assembly for attachment to the base flange of a steel beam, including a rod extending across the beam adjacent the base flange, the assembly comprising means carried by the ends of the rod and slidable over the edges of the flange, for pendently supporting objects engaged with the rod at various points therealong, and a support on the rod for a lighting fixture comprising a solid block having a lateral bore extending therethrough, through which the rod passes, and securing means for the lighting fixture, the means extending from the fixture and being threaded through, a complemental opening, in a wall of the block, at a right angle to, and in communication with, an opening through which the rod passes, for engaging the securing means with the rod, to prevent casual longitudinal displacement of said support on the rod.

6. A clamp assembly for attachment to the base flange of a steel beam, including a rod, one end of which is shaped for slidable engagement over one edge of the base flange of the beam, a bracket mounted on the free end of the rod and adapted for engagement with the other edge of the base flange of the beam, the rod being offset near its hooked end to space the rod from the bottom of the beam, the upper surface of said rod being provided with a series of uniformly spaced notches, a support member for attachment to said rod, the support member comprising a rigid strap bent into a rectangular shape with aligned openings in the opposite sides thereof adapted for the reception of the rod, that portion of said metal strap adjacent the aligned side openings being adapted for engagement in the rod notches, to prevent accidental longitudinal movement of said support member with respect to said rod.

7. The assembly of claim 6, wherein the top of said rectangular support member is proximate the steel beam, to prevent said support member from being moved upwardly out of engagement with said notches.

8. The assembly of claim 6, wherein the free ends of the rigid strap are overlapped, said overlapped portions being provided with aligned openings, and securing means for an electrical outlet box extending through the openings of the overlapped strap portions, for supporting the electrical outlet box.

9. The clamp assembly of claim 6, with the addition of a support for a conduit or pipe, said support being formed of a unitary strap, and including a body portion, the free ends of which are bent into parallel relation to provide an open, oblong upper terminal, the sides of which are provided with aligned openings, through which the rod passes, that portion of the sides adjacent the openings being adapted for engagement with the notches of the rod, to prevent accidental longitudinal displacement of the support, the lower ends of the oblong sides being pinched, to provide converging intermediate portions which issue into opposed arcs adapted for the reception of objects circular in cross section, the terminals comprising parallel securing lips, and means for securing said lips together.

References Cited by the Examiner

UNITED STATES PATENTS

| | | | |
|---|---|---|---|
| 758,458 | 4/1904 | MacTaggart | 248—72 |
| 784,979 | 3/1905 | Bruce | 248—72 |
| 1,245,047 | 10/1917 | Sherman | 248—72 |
| 1,373,716 | 4/1921 | Dottl et al. | 248—72 |
| 1,784,448 | 12/1930 | Kahn | 248—72 |
| 1,814,449 | 7/1931 | Morgenstern | 220—3.9 |
| 1,930,928 | 10/1933 | Dunlap | 248—228 |
| 2,313,594 | 3/1943 | Smith | 248—228 |
| 3,022,030 | 2/1962 | Geer | 248—58 |

FOREIGN PATENTS

| | | |
|---|---|---|
| 864,686 | 1/1953 | Germany. |
| 439 | 1/1894 | Great Britain. |
| 707,252 | 4/1954 | Great Britain. |

CLAUDE A. LE ROY, *Primary Examiner.*